United States Statutory Invention Registration [19]

[11] Reg. Number: H847

White et al. [43] Published: Nov. 6, 1990

[54] METHODS OF USING CRYSTALLINE FRUCTOSE

[75] Inventors: Dorothy C. White; John S. White, both of Argenta, Ill.

[73] Assignee: A. E. Staley Manufacturing Company, Decatur, Ill.

[21] Appl. No.: 247,870

[22] Filed: Sep. 22, 1988

[51] Int. Cl.[5] ..... A23L 2/00; A23G 1/00

[52] U.S. Cl. ..... 426/590; 426/592; 426/593; 426/594; 426/597; 426/599; 426/615; 426/641; 426/580; 426/614; 426/555; 426/549; 426/602; 426/638; 426/565; 426/658; 426/659; 426/660

[58] Field of Search ..... 426/658, 590, 591

*Primary Examiner*—John S. Maples
*Assistant Examiner*—Philip Tucker

[57] ABSTRACT

Methods of using fructose as a sweetener, particularly crystalline fructose, are disclosed. Also disclosed are methods of using dry foodstuff mixes containing fructose in a crystalline form to prepare foods for consumption while hot or cold. Further, the use of fructose and acidulants to obtain a foodstuff of desired sweetness is also disclosed. The consistent sweetness of fructose over temperature, regardless of the distribution of anomeric forms thereof, and the varying effect different acidulants have on the sweetness of fructose are also disclosed.

5 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHODS OF USING CRYSTALLINE FRUCTOSE

FIELD OF INVENTION

In one aspect, this invention relates to a method of using dry foodstuff mixes containing fructose in a crystalline form to prepare foods for consumption while hot or cold. In another aspect, this invention relates to the use of fructose and acidulants to obtain a foodstuff of desired sweetness.

BACKGROUND OF THE INVENTION

L. Hyvonen, et al., "Effects of Temperature and Concentration on the Relative Sweetness of Fructose, Glucose and Xylitol", *Lebensm-Wiss. u.-Technol.*, 10:316–320 (1977), reported that temperature has a noticeable effect on the relative sweetness of fructose, i.e., that the relative sweetness of fructose varies inversely with temperature over the range of 5° C. to 50° C. in other words, Hyvonen reported that fructose is sweeter, by relative sweetness, at 5° C. than at 50° C. Because the concentration of the β-D-fructopyranose anomer in a solution also varies inversely with temperature, it has been generally inferred by those in the art that β-D-fructopyranose is the sweetest anomer of fructose in solution and that a fructose solution thus becomes sweeter as one decreases the temperature thereof. See J. Dziezak, "Crystalline Fructose: A Breakthrough in Corn Sweetener Process Technology", *Food Technology*, Vol. 41, pp. 66, 67 and 72 (January 1987).

Dziezak also discloses that the sweetness of a fructose solution increases as the pH is decreased. However, Hyvonen, et al., "The Relative Sweetness of Fructose, Glucose, and Xylitol in Acid Solutions at Different Temperatures", *Lebensm.-Wiss. u.-Technol.* 11:11–14 (1978) reports that the relative sweetness of fructose was reduced by acids at room temperature and, at page 14, Table 3, that citric, malic, and phosphoric each reduced the relative sweetness at room temperature to approximately the same degree at approximately the same pH.

SUMMARY OF THE INVENTION

The various aspects of this invention can generally be divided into two broad categories, i.e., those aspects relating to temperature phenomena and those aspects relating to acidulant phenomena.

I. Temperature

In one aspect, this invention relates to a method of preparing a foodstuff for consumption comprising:

(a) mixing a dry foodstuff mix, said foodstuff mix comprising a particulate solid consisting of crystalline fructose, with an edible liquid to form a mixture;

(b) cooling a member selected from the group consisting of said mixture and one or more components thereof, to reduce the temperature of said mixture to a first temperature within a range of desired maximum serving temperatures for said mixture;

(c) providing for the temperature of said mixture to rise to a second temperature within said range of desired maximum serving temperatures; and (d) serving said mixture for consumption as a foodstuff at said second temperature.

By "dry foodstuff mix" is meant an edible mixture of components in the solid phase (e.g., granular, powder, or the like), such mixture being sufficiently dry to be flowable. By "providing for" is meant either of both passively allowing ambient conditions to raise the temperature and actively heating the mixture.

It has been found that while the relative sweetness of fructose varies inversely with temperature, the absolute sweetness of fructose, i.e., the sweetness of fructose compared to a fructose control (as opposed to a sucrose control), does not significantly vary with temperature over the range of 5° C. to 50° C.. Thus, a foodstuff can be formulated with fructose to have consistent absolute sweetness over a range of temperature, typically about 5° C. to about 50° C..

Because fructose has a substantially constant absolute sweetness over a range of serving temperatures, e.g., about 5° C. to about 50° C., the foodstuff will be as sweet at the second temperature as the first temperature. Thus, each individual serving should be perceived by the consumer to be as sweet as the other, although a given serving may be served at a warmer temperature than another serving. Such an advantage may be most useful in the context of a beverage dispenser wherein there is difficulty in maintaining a constant serving temperature from one serving to the next, e.g., a commonly available "ice chest" type of portable, insulated cooler subjected to climatic extremes.

In another aspect, this invention relates to a method of alternatively preparing hot and cold foodstuffs for consumption comprising:

(a) mixing a first portion of a bulk reserve of a dry foodstuff mix, said dry foodstuff mix comprising a particulate solid consisting of crystalline fructose, with an edible liquid to form a first mixture;

(b) heating a member selected from the group consisting of said first mixture and one or more components thereof, to elevate the temperature of said first mixture to a temperature suitable for serving said first mixture for consumption;

(c) mixing a second portion of said bulk reserve of said dry foodstuff mix with an edible liquid to form a second mixture; and (d) cooling a member selected from the group consisting of said second mixture and one or more components thereof, to reduce the temperature of said mixture to a temperature suitable for serving said first mixture for consumption.

In one set of embodiments of this aspect, the dry foodstuff mix is a dry instant beverage mix comprised of a blend of crystalline fructose and a dry flavoring material (e.g., cocoa, instant tea, instant coffee, fruit powder, etc.), which blend can be added to a hot or cold liquid (e.g., milk, water, etc.) to form a hot or cold beverage (e.g., cold chocolate milk or hot cocoa, hot tea or iced tea, hot coffee or iced coffee, hot or cold fruit punch, etc.).

II. Acidulant

In another aspect, this invention relates to a method of formulating a sweetened and acidulated foodstuff comprising:

(a) replacing at least a portion of the sweetener in a given sweetened foodstuff formulation with a particulate solid consisting of crystalline fructose, said foodstuff having a pH of below about 5 when consumed; and (b) employing a plurality of acidulants to adjust the sweetness of said formulation, said plurality comprising citric acid, or a salt thereof, and an edible, non-citric, fructo-sweetness active acid, or a salt thereof.

By "edible, non-citric, fructo-sweetness active acid", is meant an acid other than citric acid which is edible and which effects (i.e., either enhances or suppresses) the sweetness of fructose in solution at a pH of about 3. Examples of such acids include malic acid and phosphoric acid, both of which suppress the sweetness of fructose, i.e., they are fructo-sweetness suppressive.

It has been found that various acids have a varying effect on the absolute sweetness of fructose in a given food formulation having a pH of less than about 5, e.g., typically about 3. In particular, it has been found that citric acid has a greater suppressive effect than at least two other acids commonly, employed as acidulants, i.e., malic acid and phosphoric acid. Accordingly, one can adjust the sweetness of a food formulation containing fructose as a total or partial replacement for another sweetener, by varying the relative amounts of a plurality of acidulants. It should be made clear that this adjustment can be made to either enhance or suppress the sweetness of the food. For example, a portion of the citric acid in a beverage can be substituted with phosphoric acid to enhance the sweetness thereof and thus allow one to reduce the amount of fructose in the beverage (and thus the caloric content). Alternatively, if comparatively greater fructose sugar solids are desired in a formulation, (e.g., a pie filling), a portion of the malic acid that one might use as an acidulant can be substituted with citric acid to reduce the sweetness without reducing the amount of fructose.

In a particular aspect, this invention relates to a beverage concentrate comprising:

(a) a particulate solid consisting of crystalline fructose, said fructose being present in a first amount; and (b) an acidulant comprised of citric acid in a second amount, and an edible, non-citric, fructo-sweetness active acid in a third amount;

(i) said second and third amounts are, in the aggregate, sufficient to provide a beverage having a pH of less than about 5;

(ii) said first amount is sufficient, in relation to said second and third amounts, to provide a sweetened beverage.

DETAILED DESCRIPTION OF THE INVENTION

Figure 1:
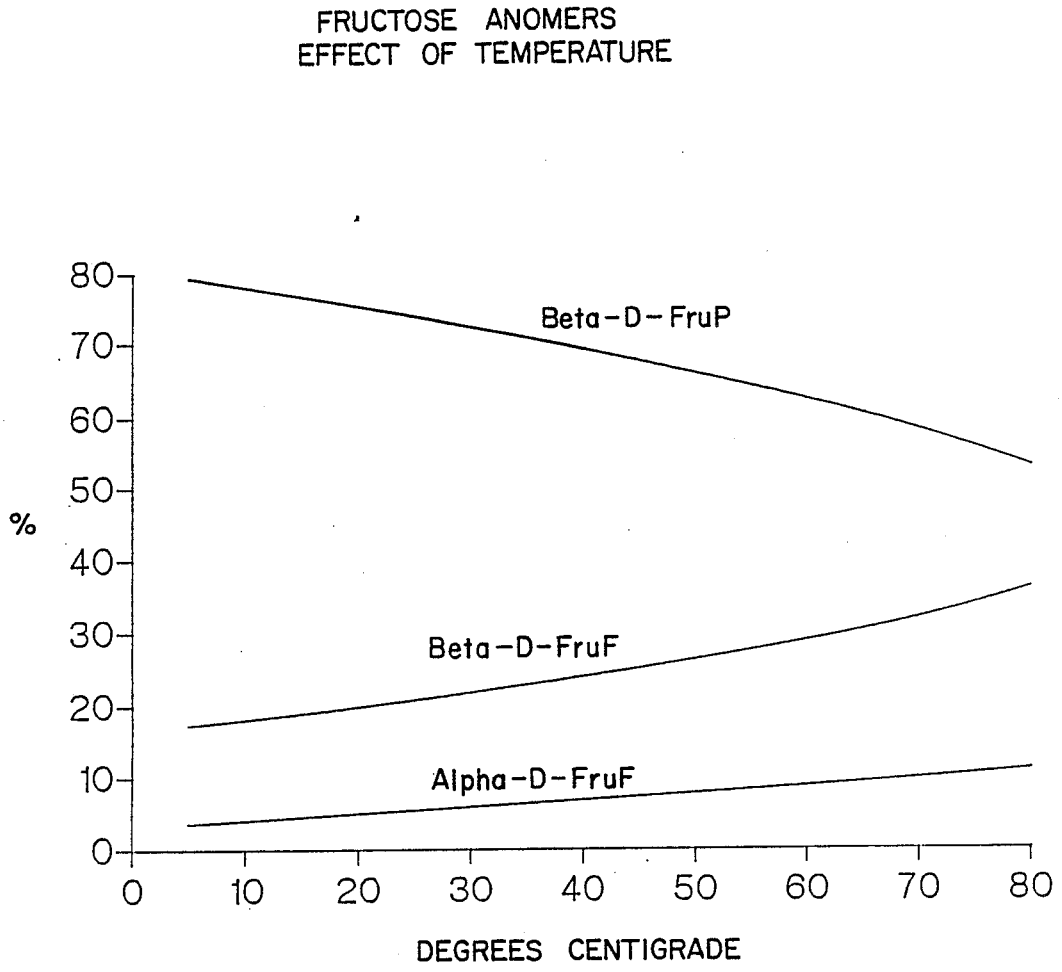
FIG. 1 is a graph of the distribution of the various anomers of fructose (as weight percent of total fructose) in solution over a range of temperature.

One common element of the various aspects of this invention is fructose. The crystallization of fructose is disclosed in U.S. Pat. No. 3,883,365 (Forsberg, et al.) U.S. Pat. No. 3,928,062 (Yamauchi), U.S. Pat. No. 4,199,374 (Dwivedi, et al.), and U.S. Pat. No. 4,643,773 (Day). By "crystalline fructose", it is meant a solid composition wherein substantially all of the fructose is contained in a crystal matrix. Crystalline fructose is to be distinguished from materials containing significant amounts of amorphous fructose, dextrose or corn syrup by-products, e.g., dried high fructose (e.g., 42% or 55% dry solids) corn syrups and the semi-crystalline fructose disclosed in U.S. Pat. No. 4,517,021 (Schollmeier). Crystalline fructose is available commerically at a purity in excess of 99.0% as the anhydrous crystalline form of β-D-fructose, for example, KRYSTAR TM brand crystalline fructose available from A. E. Staley Manufacturing Division of Staley Continental, Inc., Decatur, Ill. A "particulate solid consisting of crystalline fructose" is generally granular or powder-type in nature, i.e., the weight average particle size generally varies from about 1 to about 1,000 microns, more typically 250–500 microns (e.g., 300 or 450 microns).

It is known that only the β-D-fructopyranose form of fructose occurs in the crystalline state. However, when fructose is dissolved in water, three anomeric forms are readily apparent:

1. β-D-fructopyranose (β-D-fruP)
2. β-D-fructofuranose (β-D-fruF)
3. α-D-fructofuranose (α-D-fruF)

Of these forms, β-D-fruP is generally present in aqueous solution in a major amount (e.g., about 55% to about 80%), β-D-fruF in a minor amount (e.g., about 15% to about 35%), and α-D-fruF in a nominal amount (e.g., about 5% to about 10%).

Because β-D-fruP is the predetermined form in solution and because the furanose forms are reported to be only very slightly sweet (Shallenberger, 1978), it was assumed in the art that the β-D-fruP anomer must be responsible for the perceived sweetness of fructose. For this reason, it was assumed that the β-D-fruP anomeric form could be used as an indicator of sweetness, i.e., the more β-D-fruP present, the more sweet the solution should be, and the more β-D-fruF and β-D-fruF at the expense of the β-D-fruP anomer, the less sweet the solution.

The traditional method of evaluating fructose sweetness is to taste fructose solutions against a sucrose control under like conditions. From an applications standpoint, this evaluation for "relative sweetness" is the most practical because if one desires to replace sucrose with fructose in a cold beverage, one needs to know how the sweetness of fructose compares with that of sucrose in that beverage system at refrigerated temperatures. However, from a chemical perspective, it seems cumbersome to correlate fructose anomeric configuration to the sweetness of sucrose. Instead, it was decided to evaluate "absolute sweetness" of fructose, or fructose tasted against a constant fructose standard which will be referred to herein as "absolute sweetness".

The approach to correlating fructose anomeric distribution as measured by NMR to fructose "absolute sweetness" was broken down into three key steps:

(1) First of all, the anomeric distribution of fructose solutions was measured by NMR to confirm the effect of temperature, pH and acidulants and concentration as reported in the literature.

(2) Then, using this same method, the anomeric distribution of fructose was determined in actual foods for several reasons:

(a) first of all, to determine if the anomeric distributions of the fructose of foods responded in the same way as the simple solutions under the various tested conditions, and (b) to know the distributions of the fructose in foods and thus eventually attempt to correlate such distributions with sensory testing.

(3) The third step was to actually do sensory testing for "absolute sweetness" of fructose in products with known anomeric distributions.

STEPS 1 AND 2

Anomeric Distribution in Aqueous Solutions

NMR measurements of anomeric distribution of fructose solutions did in fact confirm the work by Hyvonen, et al.

FIG. 1 shows the effect of temperature on anomeric distribution of fructose solutions (i.e., the percent of each anomer over the range of about 5° C. to about 80° C.). The amount of β-D-fruP lessens with increasing temperature. In other words, the hotter the solution, the less of the β-D-fruP anomer.

Figure 2:
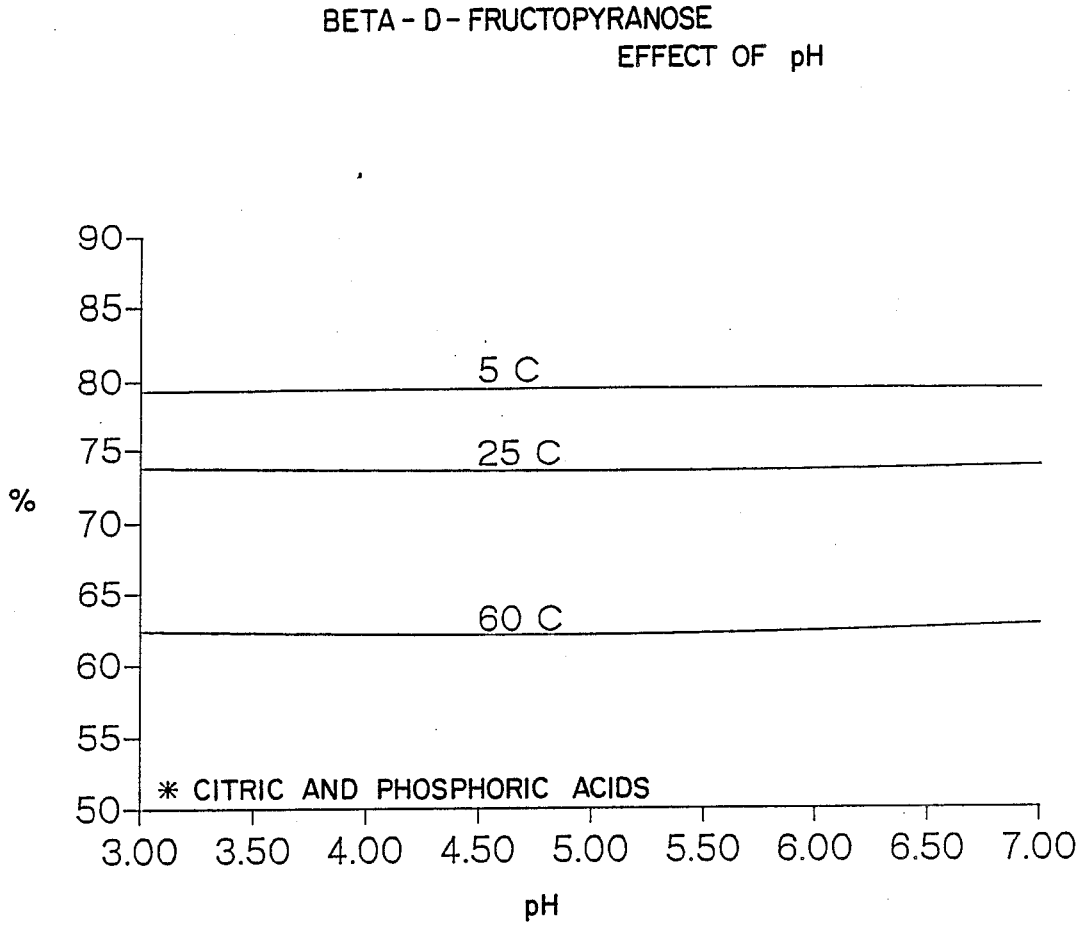
FIG. 2 is a graph of the amount of β-D-fructopyranose anomer (as weight percent of total fructose) in solution over a range of pH at three different temperatures.

FIG. 2 shows the effect of pH. In this case, the effect of acidulant was the same for critic and phosphoric acids (i.e., the lines coincide). The amount of β-D-fruP does not substantially change from pH 3 to 7.

Figure 3:
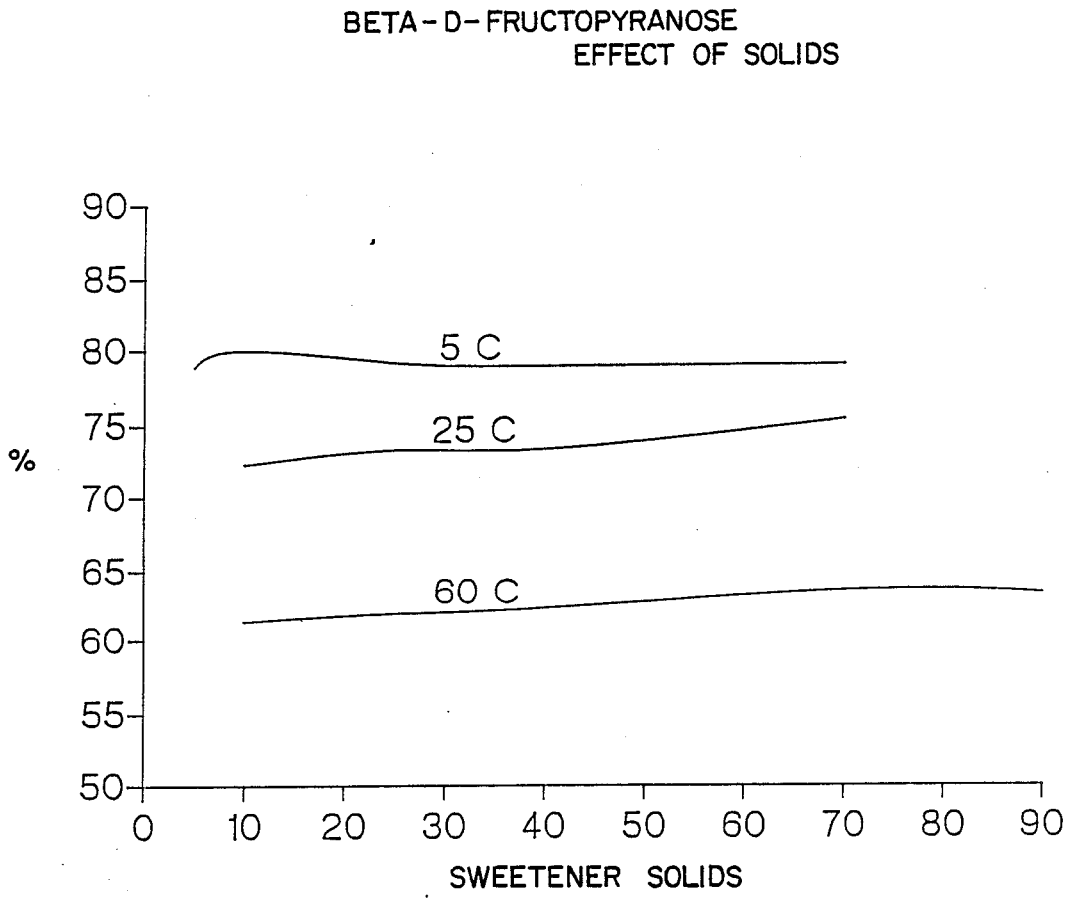
FIG. 3 is a graph of the amount of β-D-fructopyranose anomer (as weight percent of total fructose) in solution over a range of total fructose concentration (by dry solids).

FIG. 3 shows the effect of concentration. Only a very slight increase (probably not significant) can be seen with increasing concentration.

Anomeric Distribution in Food Systems

The anomeric distribution of fructose in food correlated well to that of the corresponding aqueous solutions. In other words, distribution of the anomeric forms of fructose in a cherry pie filling, for example, at 29% ds (dry solids) and pH 2.5, matched the aqueous profile at pH 3 and 30% ds. Also, the close correlation between anomeric distribution of simple aqueous solutions and complex food systems implies that fructose interaction with starch in medium and high moisture systems has no effect on the distribution of fructose anomers.

SUMMARY OF STEPS 1 AND 2

In summary, based on the NMR work with solutions and foods with respect to the effects of temperature, pH, acidulants and concentration, only temperature causes a significant anomeric shift between the various anomers of fructose. From this, it can be concluded that any perceived changes in sweetness that are apparently caused by pH or acid type or concentration cannot be attributed to the mutarotational behavior of the fructose anomers because the anomeric distribution is not dependent upon these factors.

STEP 3: SENSORY EVALUATION OF "ABSOLUTE SWEETNESS" OF FRUCTOSE IN SOLUTION AND FOODS

The third step was to do sensory evaluation of absolute sweetness of fructose in solutions and foods.

In the sweetness panelling, the test was designed specifically for "absolute sweetness", not "relative sweetness", of fructose in 10% ds solutions and in cherry pie filling. For aqueous solutions, panels evaluated solutions at 5° C., 38° C. and 50° C., and at pH 3, 5 and 7 with citric, malic and phosphoric acids. For pie fillings (see Example 3, below), the effect of temperature at 5° C. and 38° C. was determined (with reference to a control at 25° C.). All samples were tested against a room temperature fructose standard of unchanging solids. All samples were prepared one day prior to panelling and maintained at the temperature to be tasted to ensure complete mutarotation of the fructose anomers. Sweetness was calculated by the method described by R. M. Pangborn, "Relative Taste Intensities of Selected Sugars and Organic Acids", *J. Food Science,* Vol. 28, p. 725 (1963).

"Absolute sweetness" is to be distinguished from "relative sweetness". In "relative sweetness" evaluations, the sweetness of a test composition is evaluated versus a sucrose control and thus allows a determination of the sweetness of the test composition relative to sucrose. In such testing, the compositions are typically water-sweetener solutions containing 10% dry solids. The temperature of the solution is adjusted to about 20° C.; and the solution is evaluated by persons trained in sensory evaluation. Using such a technique, a sucrose control is arbitrarily defined as 100%. Other sweeteners are then ranked relative to sucrose.

Fructose usually has a relative sweetness of about 115% as determined by this particular evaluation technique. Relative sweetness is measured by determining the concentration at which a sweetener is judged to be sweeter than the control sweetener by one-half of a given taste panel and less sweet than the control by the other half of the test panel. The relative sweetness is then calculated by dividing the control's concentration by the concentration determined for the sweetener being evaluated. Such techniques are described by R. M. Pangborn, *J. Food Science,* Vol. 28, p. 726 (1963).

Results of the sensory work were quite surprising.

Figure 4:
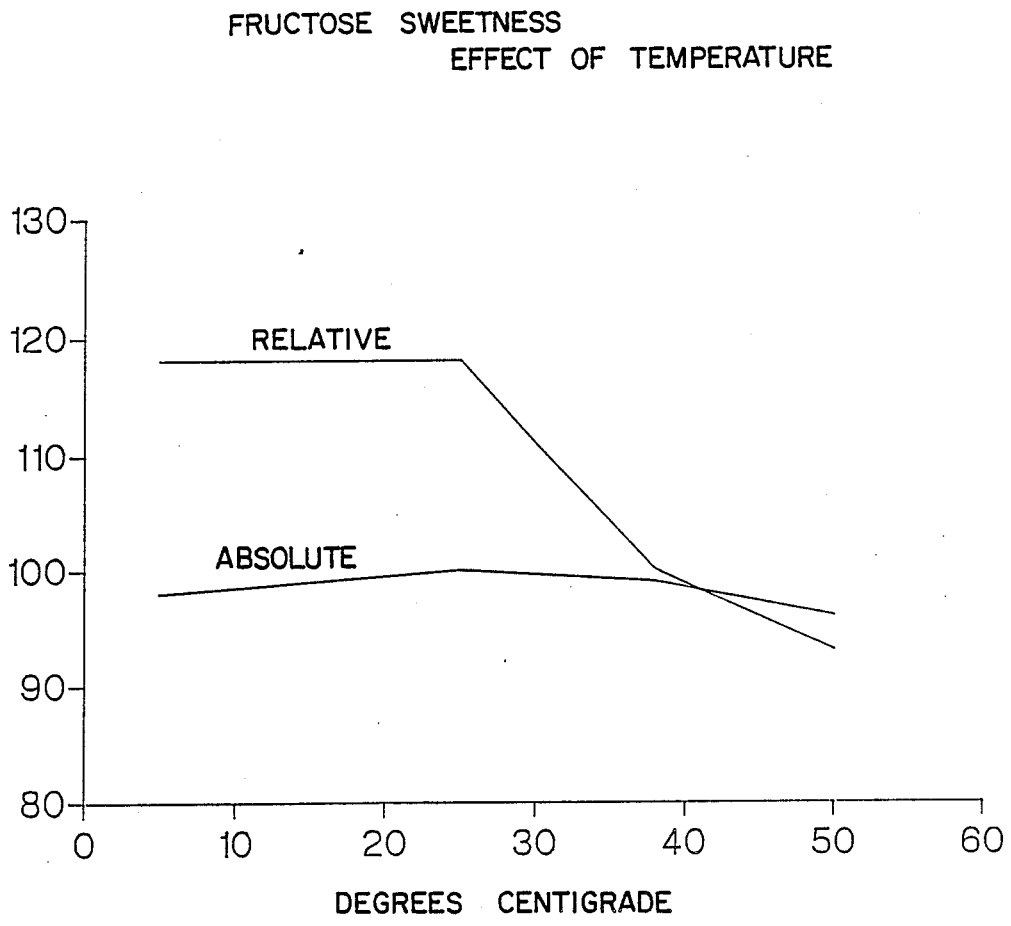
FIG. 4 is a graph of both the "relative sweetness" of fructose and the "absolute sweetness" of fructose in solution over a range of temperature. (Table B, below, sets forth the data used to generate FIG. 4.)

In FIG. 4 (and Table A), it can be seen that unlike relative sweetness (see Hyvonen, et al.), absolute sweetness of fructose solutions did not change with temperature, i.e., fructose solutions at 10% ds tasted as sweet at 50% C as at 25° C. and 5° C..

TABLE A

Absolute Sweetness of Fructose of Varying Temperatures

| Test Sample Description | Absolute Sweetness* | % of β-D Fructofuranose |
|---|---|---|
| 40° F. (5° C.) | 98 | 78.3 |
| 77° F. (25° C.) | 100 | 72.3 |
| 100° F. (30° C.) | 99 | 69.2 |
| 122° F. (50° C.) | 96 | 65.0 |

*Tested against 10% dry solids aqueous solution of crystalline fructose at room temperature and a pH of 5.

In the cherry pie fillings, this was also true. Cherry pies which were tasted warm were as sweet as those tasted at refrigerated temperatures as shown in Table B, below.

TABLE B

Effect of Temperature on Absolute Sweetness of Cherry Pie Filling Formulated With Crystalline Fructose

| Temperature of Cherry Pie Filling | Absolute Sweetness* | % β-D-fruP |
|---|---|---|
| 40° F. (5° C.) | 102 | 80.4 |
| 77° F. (25° C.) | 100 | 74.2 |

TABLE B-continued

| Effect of Temperature on Absolute Sweetness of Cherry Pie Filling Formulated With Crystalline Fructose | | |
|---|---|---|
| Temperature of Cherry Pie Filling | Absolute Sweetness* | % β-D-fruP |
| 100° F. (38° C.) | 104 | 69.1 |

*Control - defined at 100 for 25° C.

Figure 5:
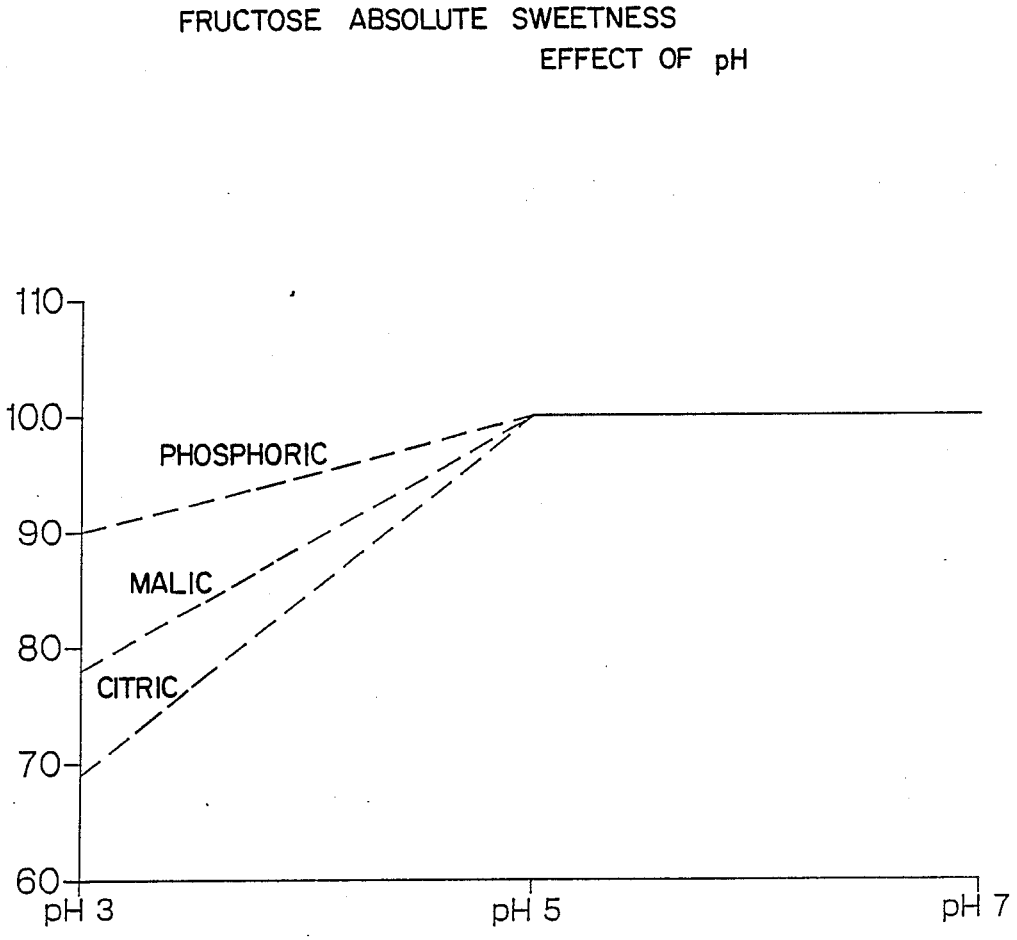
FIG. 5 is a graph of the absolute sweetness of fructose at differing pH by virtue of three different acids. (Table C, below, sets forth the data used to generate FIG. 5.)

FIG. 5 (and Table C) shows the effect of pH and acidulants. Absolute sweetness is unaffected from pH 5–7 regardless of which acid is present. However, at pH 3, sweetness is depressed; and how much is dependent on which acid is used, with citric acid depressing sweetness the most, malic acid next, and phosphoric acid least.

TABLE C

| Effect of pH on Absolute Sweetness of Fructose | | |
|---|---|---|
| Test Sample | Absolute Sweetness* | % β-D-fruP |
| pH 3 citric | 69 | 73.6 |
| pH 3 malic | 78 | — |
| pH 3 phosphoric | 90 | 73.0 |
| pH 5 | 100 | 72.9 |
| pH 7 | 100 | 72.7 |

*Tested against a 10% dry solids aqueous solution of crystalline fructose at room temperatures and a pH of 5.

SUMMARY

In summary, how well does anomeric distribution correlate to fructose sweetness?

Figure 6:
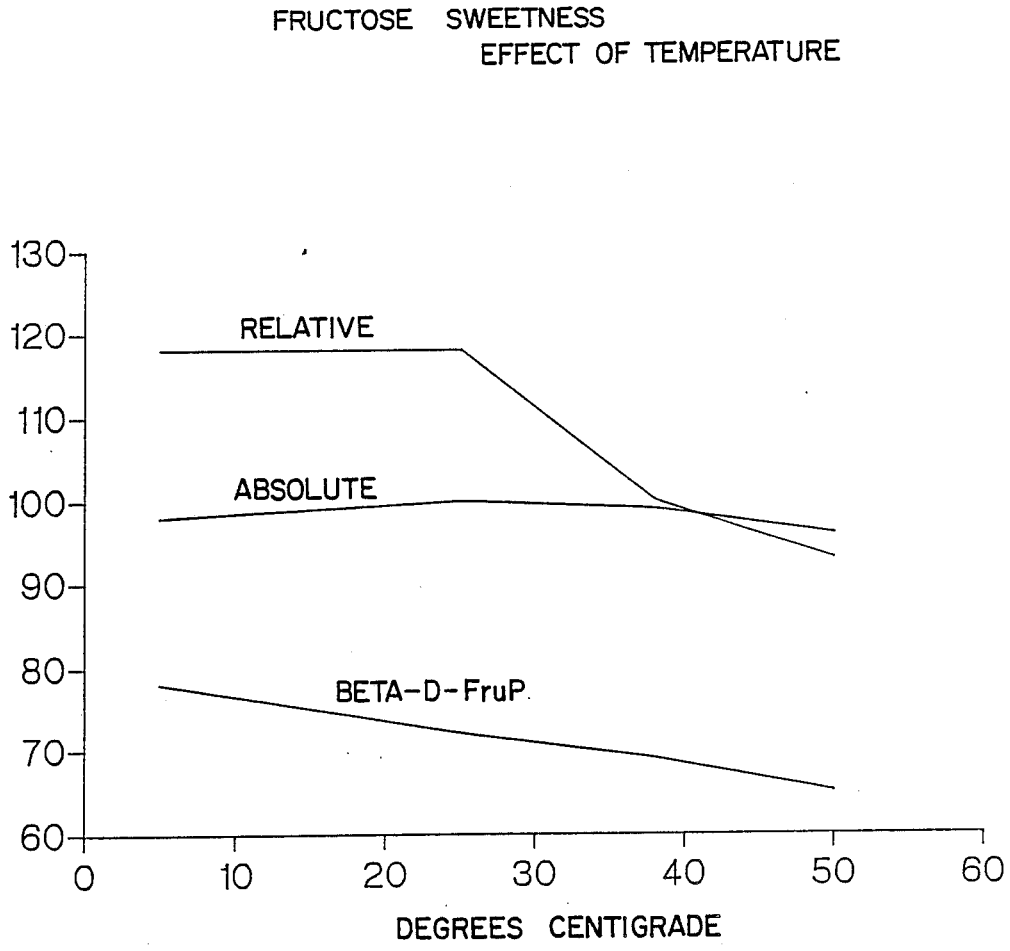
FIG. 6 is a graph superimposing both the curves of FIG. 4 and the β-D-fructopyranose curve of FIG. 1 for purposes of comparison.

FIG. 6 shows that with respect to the effect of temperature, there does not appear to be any correlation between the so-called sweet, β-D-fruP anomer and absolute sweetness because it appears that the β-D-fruP decreases significantly with increasing temperatures while the absolute sweetness of fructose does not change.

Figure 7:
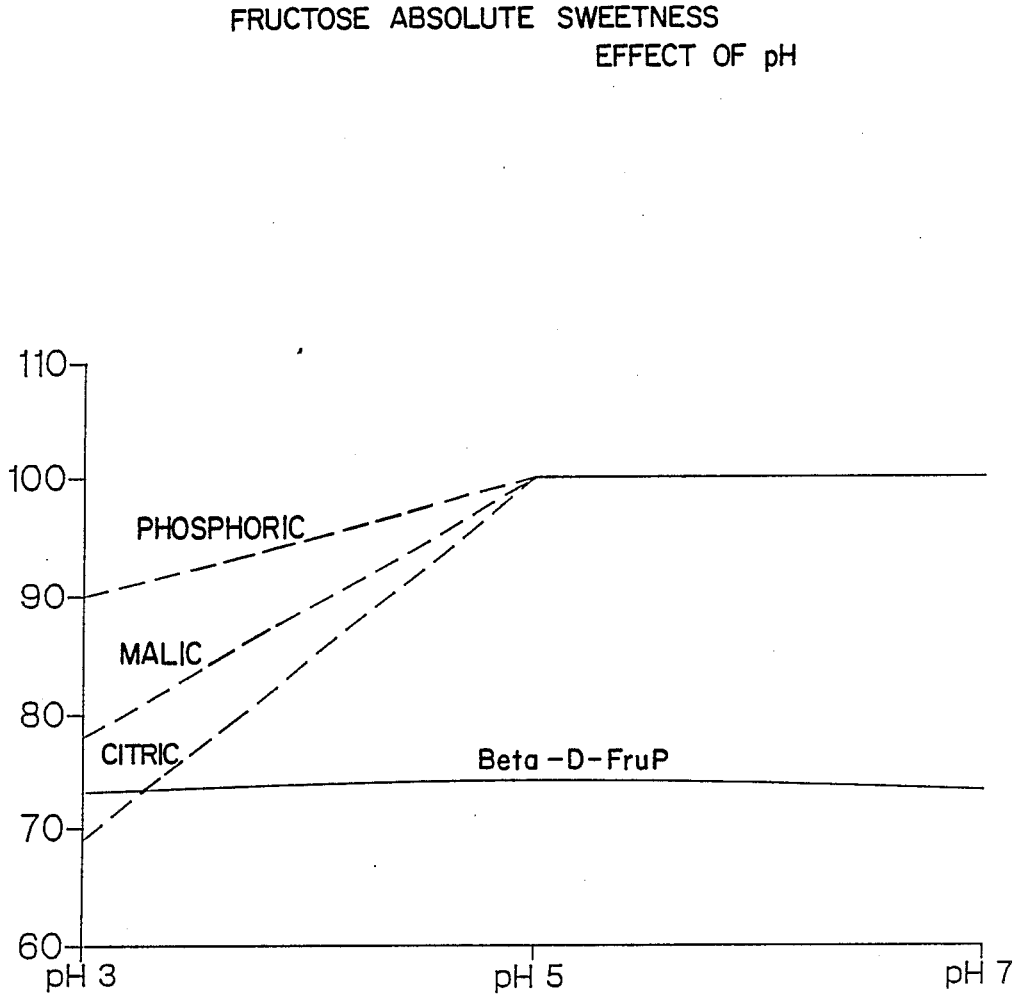
FIG. 7 is a graph superimposing both the curves of FIG. 5 and the 25° C. curve of FIG. 2 for purposes of comparison.

FIG. 7 shows that while the amount of β-D-fruP remains constant regardless of pH and the type of acid used, fructose absolute sweetness is depressed at low pH and with the use of acids. (In this figure, citric acid and phosphoric coincide.)

CONCLUSIONS

Conclusions that were drawn from this study:

(1) It is much more meaningful to consider absolute sweetness of fructose rather than relative sweetness when correlating to fructose anomers.

(2) There is no correlation between absolute sweetness and anomeric distribution of fructose as a function of temperature, pH, and acid used.

(3) Therefore, the use of NMR measurment of fructose anomeric distributions is not useful for the prediction of fructose sweetness.

The above data and conclusions can be used to advantage in formulating a variety of materials which are intended for consumption, or at least contact with the mouth of the user, such materials being herein generically designated as edible materials. Typical illustrative examples of edible materials which may be sweetened according to this invention are fruits, vegetables, juices or other liquid preparations made from fruits or vegetables, meat products, particularly those conventionally treated with sweetened liquors, such as bacon, and ham, milk products (such as chocolate dairy drinks), egg products(such as eggnogs and custards), angel food mixes, salad dressings, pickles and relishes, ice creams, sherbets and ices, ice milk products, bakery products, icings, confections and confection toppings, syrups and flavors, cake and pastry mixes, beverages, such as carbonated soft drinks, fruit "ades" (e.g., lemonade), wines, dietary-type foods, cough syrups and other medicinal preparations, such as toothpastes, powders, foams and denture-retaining adhesives, mouth washes and similar oral antiseptic liquids, tobacco products, adhesives for gumming stamps, envelopes, labels and the like.

Foodstuffs which are particularly appropriate in the context of this invention include those which are commonly consumed both hot and cold. Examples include processed meats, fish, or fowl (e.g., wieners, luncheon meats, sausages, hams, surimi, etc.); pork and beans; sauces, coatings, and breadings (e.g., salad dressings, barbecue sauces, chocolate sauces, coating mixtures of fried chicken, etc.); infused fruit and fruit fillings; instant oatmeal; table syrup; meat or pastry glazes (e.g., ham glaze or cake frostings); beverages (e.g., flavored coffee mixes, instant tea mixes, coffee whiteners, baby formula, milk shakes, meal replacement beverage mixes); sweetened condensed milk; soups; cheese foods; cheese spreads; and breads (e.g., sweet rolls or fruit breads).

Further, while the above data and conclusions are most advantageously employed when crystalline fructose is the sole sweetener used in a given formulation, the data may be advantageously employed in the use of a blend of sweetening agents, said blend being comprised of fructose. Examples of other sweetening agents include nutritive saccharide sweeteners, e.g., dextrose, sucrose, corn syrup, high fructose corn syrup, semi-crystalline fructose, and the like, as well as high intensity sweeteners, e.g., dipeptides such as aspartame and proteinaceous materials such as thaumatin. Further examples include high intensity sweeteners, e.g., saccharin, acesulfame-K, and chlorodeoxy, sugars, and glycyrrhizin. In general, however, the sweetening agent employed herein should derive a predominant portion of its sweetening effect from fructose, e.g., greater than 90% by weight of saccharide sweetener solids should be fructose.

In using a sweetening agent comprised of fructose in accordance with these teachings, it can be incorporated in the material to be sweetened in the amount required to attain the desired level of sweetness. Moreover, the technique of sweetening materials in accordance with these teachings offers no difficulty because the sweetening agent, as a mix or as separate components, can be simply incorporated with the material to be sweetened. The sweetening agent may be added directly to the material or it may be first incorporated with a diluent to increase their bulk and added to the material. As diluent, if needed, one may use liquid or solid carriers, such as water, starch, maltodextrin, corn syrup, corn syrup solids, sorbitol, salt, or other non-toxic substances compatible with the material to be sweetened. In fact, an aqueous solution of crystalline fructose, e.g., at 70% to 80% dry solids, may be an advantageous form of liquid fructose for use in accordance with these teachings. Advantages, methods of preparation, and other useful information relating to such a concept as disclosed in U.S. Ser. No. 173,404, filed Mar. 25, 1988, the disclosure of which is incorporated herein by reference.

A foodstuff mix formulation useful in this invention will generally contain a flavoring agent in addition to the sweetener. The use of various flavors is within the skill of the formulation art. Various flavors and spices are discussed and referenced in J. A. Rogers and F. Fischetti, "Flavors and Spices", *Encyclopedia of Chemical Technology,* Vol. 10, pp. 456–488 (Kirk-Othmer eds., John Wiley & Sons, 3d ed. 1980), the disclosure of which is incorporated by reference.

A detailed description of the aspects of this invention relating to temperature and acidulant phenomena will follow. While the broadest sense of the term "dry foodstuff mix" will encompass many different types of edible materials, preferred embodiments of this aspect of this invention relate to dry mixes useful in preparing "instant" beverages, i.e., beverages prepared from a dry mix by mixing with an edible liquid without cooking (especially fruit-flavored dry mixes, e.g., Kool-Aid TM brand from General Foods). Such dry mixes also typically contain a flavoring concentrate and/or a coloring agent. Examples of typical flavor concentrates include natural or imitation fruit flavors (e.g., dried fruit powders) and/or plant products, for example, cocoa (e.g., alkali process instant cocoa), and dried extracts such as instant tea and instant coffee. Coloring agents and other examples of flavoring agents are well known in the beverage art.

In the cooling and/or heating steps of the methods of this invention, the means of cooling and/or heating are not critical, so long as they are effective to cool and/or heat and result in an edible product that is organoleptically acceptable. In order to heat or cool a mixture, it is contemplated that one or more components can be heated or cooled prior to mixing to yield a mixture that is relatively hot or cold, as desired. For example, to make a hot cocoa beverage, it is common to heat the milk and then add a room temperature dry cocoa mix. Likewise, cold chocolate milk is usually prepared by stirring a room temperature dry instant cocoa mix into cold milk.

Particularly preferred embodiments of this invention employ a dry beverage mix which contains a flavoring agent selected from the group consisting of a natural fruit flavor (e.g., fruit powders), an imitation fruit flavor, cocoa (e.g., an "instant" form thereof), a tea extract, a coffee extract, and mixtures of two or more of the foregoing. In general, such a dry mix will be comprised of a major amount by weight of sweetener (e.g., consisting of crystalline fructose) and a minor amount by weight of such a flavoring agent. Beverages made in accordance with the teachings herein will generally be comprised of a major amount by weight of an edible liquid (e.g., at least 85% by weight water), and minor amounts by weight of solids, the predominant solids being sweetener solids, e.g., from about 5% to 15% by weight of the beverage.

With respect to the serving temperatures of the invention, different foods are commonly served within different ranges of temperature, the range generally being a matter of custom and/or personal preference. Because of variations in the efficiencies of heating and/or cooling, these ranges and the temperatures of individual servings within these ranges can vary widely, with or without the intent or knowledge of the server and/or consumer. However, a cold beverage, for example, will generally have a desired maximum serving temperature, i.e., a temperature above which a substantial segment of a potential consuming public will consider the beverage unacceptable. Thus, the temperature of a given serving of a cold beverage at the time of consumption can vary widely, but will generally be below a maximum serving temperature desired by the consumer. It is an advantage of this invention that while the temperature may very widely within a range, the sweetness perceived by a consumer should not vary. Thus, a product having consistent sweetness over temperature can be formulated, manufactured, sold and consumed.

The use of acidulants, particularly in beverages, is well known in the art. See, for example, J. Woodroof and G. Phillips, *Beverages: Carbonated and Non-Carbonated,* (3d ed. AVI Publ. Co. 1981), the pertinent portions (pertinent with respect to all aspects of this invention) of which are incorporated by reference. Given the general teachings herein, one of ordinary skill in the art of formulating various foods should be able to modify a given formulation in accordance with this invention to optimize the properties desired therein. In this respect, while certain embodiments of this invention are limited in scope to the use of a plurality of acidulants, it is contemplated that the teachings herein will be useful in the context of total substitution of a particular acid with another acid, e.g., total replacement of citric with malic or phosphoric.

A discussion of general principles relating particularly to dry mix beverage formulation is appropriate. If a commercially available beverage flavor base is used for the preparation of the dry beverage mix of the present invention, various substances may optionally be added to the flavor base in processing it in accordance with the presence invention to provide a dry beverage mix. The only criterion that limits the possible inclusion of any optional ingredient is that it must be acceptable for use in an edible food product. Other than this restriction, only the appearance of an undesirable off-taste or off-color for a particular beverage will place a practical limitation on the addition of any desired material. As those skilled in the art will appreciate, the variety of different materials which may be added is extremely broad indeed. For example, certain embodiments of the present invention are concerned with a dry beverage mix which will be dissolved in water at the point of consumption. In doing this, a consumer will most likely use tap water which is slightly alkaline due to the mineral salts dissolved therein. Thus, to neutralize this additional alkalinity, additional acid may be needed to achieve the same intensity of acidulation as that achieved when distilled or de-ionized water is used as a beverage base.

Other materials which may be included in the mix are various additional flavoring ingredients which may be added to the commercial flavor base to modify its flavor, accentuate any especially preferred flavor notes, or replace any flavor notes which may be volatilized and lost during processing into a dry mix. Some of the more common flavoring ingredients which can be added to a cola beverage include, for example, extract of coca leaves, neroli oil, lime oil, lemon oil, orange oil, nutmeg oil, vanilla extract or cassia oil. Other flavoring materials for colas or any other desired beverage may be found in published formulation recipes for the particular beverage flavor desired.

Other types of materials, such as food colorings, for example, U.S. Certified Food Colors or caramel coloring; stimulants, for example, caffeine; artificial sweeteners, for example, saccharine; bodying agents, for example, maltodextrin or sodium carboxymethylcellulose; forming agents, for example, licorice root extract or saponin-bearing extract of soaproot; or preservatives, for example, sodium benzoate, propylene glycol or ascorbic acid may advantageously be added to the flavor base to achieve the respective desired results. Stabilizers for cola, e.g., monosodium phosphate, may also be added to the flavor base.

The ingredients of the dry mix can be a simple blend, which is not necessarily homogeneous in any sense. However, the method disclosed in U.S. Pat. No. 4,199,610 (Hughes, et al.) may, nonetheless, be useful. In that method, a uniform slurry of pulverized sugar (e.g., fructose), liquid flavor and phosphoric acid is vacuum dried to prepare a dry beverage mix.

In forming the dry beverage mix of Hughes, et al., the proper flavor base is blended with finely powdered sugar to form a thick, homogeneous slurry. In this regard, it may be necessary to add a small amount of water for workability and to achieve thorough admixing of the ingredients. Only so much water as is necessary for these purposes should be added since any added water is subsequently removed during the drying operation and excess water only contributes to the inefficiency of the process. Any type of conventional mixing means may be used for this purpose, as long as a thorough mixing is achieved. Typically, however, the temperature of the slurry is kept below about 100° F. during admixture to avoid any loss of volatiles or heat degradation of flavor components. With this consideration in mind, it was thus recommended that low-shear mixing means be employed, since these will impart less energy to the mixture, and correspondingly, less heat.

The admixture of flavor base, the powdered beverage sugar, and any optional ingredients is then dried to a substantial dryness using conventional vacuum or freeze drying techniques to produce a dry beverage mix. Substantial dryness is that state where the matter has the appearance of a free-flowing, dry-to-the-touch solid. This will typically mean drying to a final moisture content of less than about 1%, and preferably, less than about 0.5%. That the slurry is dried by vacuum drying, or equivalent techniques, causes the drying material to foam, so as to form a beverage mix which is rapidly dissolvable in water requiring only a minimum amount of agitation. Vacuum drying techniques are known to those skilled in the art and will not be detailed herein for purposes of brevity. Best results may be obtained if the slurry is dried within a period of about twenty-four hours and the temperature of the slurry is not raised above about 100° F., and preferably above 50° F., during the drying process. Conventional freeze drying techniques are equivalent to the vacuum drying techniques in the results obtained and may thus be advantageously employed. Freeze drying basically involves freezing to temperatures of about −10° F. to about −40° F. and removing the water by sublimation as the frozen slurry is gradually warmed under vacuum conditions. Again, any of the conventional freeze-drying techniques known to those skilled in the art are suitable.

The dried product resulting from the dehydration step is ground by conventional size reduction techniques so as to make it more readily dissolvable when added to water and to enhance the appearance of the final product. Depending upon the fineness to which the particles are ground, they may be screened to obtain groups of approximately uniform particle size.

The dry beverage mixes can be packaged in suitable aliquot portions for subsequent dissolution in a predetermined amount of water to obtain flavorful beverage ready for consumption. The dry beverage mixes of the present invention may be advantageously employed with a variety of carbonation systems to provide suitably carbonated, flavorful beverages. For instance, the dry beverage mixes as disclosed herein can be added to pre-carbonated water, or, the dry beverage particles can be combined with an economical point-of-consumption carbonation system and this combination then added to tap water to provide a convenient, carbonated beverage. Examples of suitable sources of pre-carbonated water are the use of bottled pre-carbonated water, commonly known as "club soda" or the use of pressure carbonators which utilize $CO_2$-charged cylinders to carbonate water as it is dispensed, such as is done at a soda fountain. Examples of point-of-consumption systems which utilize regular tap water for the beverage include the use of a "chemical couple" such as those disclosed in Mitchell, et al., U.S. Pat. No. 3,241,977, issued Mar. 22, 1966, or Hovey, U.S. Pat. No. 3,492,671, issued Jan. 27, 1970; or the use of $CO_2$-loaded zeolite molecular sieves, such as that disclosed in U.S. Pat. No. 3,966,994, issued June 6, 1976. The latter-named carbonation system, i.e., the use of $CO_2$-loaded zeolite molecular sieves, is especially preferred in the practice of the present invention.

It is important that the dry mixes of the present invention be packaged in a moisture-proof container, in that the particles are hygroscopic in nature and that the particle physical structure collapses when wetted. Also, exposure to moisture would activate any phosphoric acid present in the dry mix which would lead to degradiation of the sugar and flavor components in the mix. A convenient method for insuring that these mixes are not degraded by exposure to moisture during storage periods is to have them packaged in the presence of a desiccant. The $CO_2$-loaded molecular sieves disclosed in the above-mentioned U.S. Pat. No. 3,966,994 is a suitable desiccant for such purposes. Thus, the presence of such $CO_2$-loaded zeolite molecular sieves in combination with the dry flavor mix has multiple advantages in that they provide protection of the dry mixes during storage, provide a convenient and sufficient carbonation system during use, and the effervescent action resulting form the molecular sieves immersed in water is sufficient to provide adequate agitation for the dissolution of the dry mixes.

EXAMPLES

Example 1

Instant Fruit Drink from Dry Mix Concentrate

An instant fruit drink (cherry flavored) is made from a dry mix consisting of:

| Ingredient | Parts by Weight |
|---|---|
| Crystalline Fructose (KRYSTAR TM brand, A. E. Staley Manufacturing Co.) | 83 |
| Citric Acid | 1.8 |
| Ascorbic Acid | 0.1 |
| Tricalcium Phosphate | 0.015 |
| Maltodextrin (5 D.E.) | 2.3 |
| Color (Warner Jenkinson Color No. 7425) | 0.035 |
| Cherry Flavor (Universal Flavors) | 0.285 |
| | 87.535 |

To prepare the dry mix, dry blend the foregoing ingredients. To prepare a beverage, mix the 87.535 parts of the dry blend with 912.465 parts by weight water which should yield 1,000 parts by weight cherry drink mix. Divide the 1,000 parts into three individual servings and cool all to approximately the same temperature of 5° C.. Consume one serving maintained at 5° C. until consumption, allow a second to warm to about 25° C. prior to consuming, and heat one to about 38° C. prior to consuming.

Example 2

Instant Vanilla Pudding From Dry Mix

An instant vanilla pudding can be prepared from the following ingredients:

| Ingredient | Parts by Weight (grams) |
|---|---|
| Crystalline Fructose (see Ex. 1) | 74.0 |
| Emulsifier (Durem TM 114, Durkee Foods) | 0.5 |
| Vegetable Oil | 0.5 |
| Disodium Phosphate | 0.6 |
| Tetrasodium Phosphate | 1.0 |
| Table Salt | 0.5 |
| Color (Warner Jenkinson No. 8038, egg shade - wt. of total liquid) | 0.4 |
| Imitation Vanilla Flavor (wt. of total liquid) | 3.0 |
| Starch (STARCO TM 447, A. E. Staley Mfg. Co.) | 17.5 |
| Total | 98.0 |

A dry mix instant pudding composition is prepared as follows: Melt the emulsifier and vegetable oil together and then coat melted blend onto the crystalline fructose while mixing with a conventional household mixer at low speed. Add the remaining dry ingredients and mix into the oil-sweetener mixture to form a dry milk.

An instant pudding can be prepared from the dry mix as follows: Make up at least three individual packets of 98 grams each and store. Add one 98 g packet of dry mix to 450 ml of cold (5° C.) milk and mix for two minutes with conventional household mixer at low speed. Add a second 98 g packet of the dry mix to 450 ml of milk at room temperature (25° C.) and mix as above. Add a third 98 g packet of the dry mix to 450 ml of warm milk (38° C.) and mix as above.

Example 3

Several cook-up cherry pies were baked to evaluate fructose (KRYSTAR TM) in the system by NMR and for sensory evaluation. All sweeteners in typical formula were replaced with KRYSTAR TM brand crystalline fructose.

| | Total Wt. | Solids % | Solids g |
|---|---|---|---|
| Part A | | | |
| Frozen Cherries | 200.00 | 15.1 | 30.2 |
| KRYSTAR 300 | 356.00 | 100 | 356.0 |
| Salt | 2.00 | 100 | 2.0 |
| Citric Acid | 2.00 | 100 | 2.0 |
| Water | 404.00 | | |
| Part B | | | |
| Water | 160.00 | | |
| Starch (REZISTA TM F1600E available from A. E. Staley Mfg. Co.) | 76.00 | 88 | 66.88 |
| Part C | | | |
| Frozen Cherries | 800.00 | 15.1 | 120.8 |
| | 2000.00 | | 577.88 |

The resulting filling is 28.89% solids (577.88/2000.00) and 17.8% sweetener solids (356.0/577.88).

Procedure:

1. Part A was placed in a steam kettle and brought to a boil.
2. Part B was added and the mixture was cooked until clear, then cooked 90 seconds longer, after which the steam was turned off.
3. Part C was added and the mixture was agitated until cool.
4. 800.0 g was placed in a pie shell, sealed and baked at 425° F. for 45 minutes

Example 4

A control cherry drink dry mix can be prepared by thoroughly dry blending the following:

| Ingredient | Wt. (grams) |
|---|---|
| KRYSTAR TM Crystalline Fructose | 82.52 |
| Citric Acid | 1.7928 |
| Cherry Flavor N/A, #S-3447 (Warner Jenkinson) | 0.278 |
| FD & C Red #40; 7700 (Warner Jenkinson) | 0.0348 |
| Ascorbic Acid) | 0.0957 |
| Tricalcium Phosphate | 0.0174 |
| Maltodextrin (5 D.E.) | 2.289 |
| | 87.03 g |

A control cherry drink beverage can be prepared by pouring the 87.03 grams of the above dry mix into a one liter container and adding water to the one liter line. The resulting one liter of beverage will contain 1.7928 g of citric acid and should have a pH of about 3 (e.g., 2.7–3.0, depending on the acidity/alkalinity of the water used).

The following table, Table D, shows the adjustment of citric acid content of the beverage (obtained by using phosphoric acid (Phos., below) alone or both citric acid and phosphoric acid in the dry mix in the amount shown) to replace the indicated percentage acidity and the wt. % reduction of the amount of crystalline fructose that one should make to obtain a beverage of equal sweetness.

TABLE D

Replacement With Phos. (75%) @ 0, 10, 25, 50, 75, 100%

| % Acidity from Phos./Citric | Acid (grams in 1 liter finished product) Phos. | Citric | Wt. % reduction in KRYSTAR to obtain equivalent sweetness |
|---|---|---|---|
| 0/100 | 0.0000 | 1.7928 | 0 |
| 10/90 | 0.0128 | 1.6135 | 2.95 |
| 25/75 | 0.0319 | 1.3446 | 7.07 |
| 50/50 | 0.0638 | 0.8964 | 13.21 |
| 75/25 | 0.0957 | 0.4482 | 18.58 |
| 100/0 | 0.1276 | 0 | 23.31 |

Likewise, malic acid can be substituted for citric acid as shown in Table E, below.

TABLE E

| Replacement With Malic @ 0, 10, 25, 50, 75, 100% | | | |
|---|---|---|---|
| % Acidity from Malic/Citric | Acid (grams in 1 liter finished product) Malic | Citric | Wt. % reduction in KRYSTAR to obtain equivalent sweetness |
| 0/100 | 0 | 1.7928 | 0 |
| 10/90 | 0.2502 | 1.6135 | 1.28 |
| 25/75 | 0.6255 | 1.3446 | 3.16 |
| 50/50 | 1.2510 | 0.8964 | 6.12 |
| 75/25 | 1.8764 | 0.4482 | 8.91 |
| 100/0 | 2.5019 | 0 | 11.54 |

While the above examples serve to illustrate and/or clarify certain aspects of this invention, variations thereof in accordance with the spirit of the teachings herein should be considered within the scope of this invention. All parts, percentages, and ratios stated herein are by weight, unless noted otherwise.

What is claimed is:

1. A method of preparing a foodstuff for consumption comprising:
   (a) mixing a dry foodstuff mix, said foodstuff mix comprising a particulate solid consisting of crystalline fructose, with an edible liquid to form a mixture;
   (b) cooling a member selected from the group consisting of said mixture and one or more components thereof, to reduce the temperature of said mixture to a first temperature within a range of desired maximum serving temperatures for said mixture;
   (c) providing for the temperature of said mixture to rise to a second temperature within said range of desired maximum serving temperatures; and
   (d) serving said mixture for consumption as a foodstuff at said second temperature.

2. A method of alternately preparing hot and cold foodstuffs for consumption comprising:
   (a) mixing a first portion of a bulk reserve of a dry foodstuff mix, said dry foodstuff mix comprising a particulate solid consisting of crystalline fructose, with an edible liquid to form a first mixture;
   (b) heating a member selected from the group consisting of said first mixture and one or more components thereof, to elevate the temperature of said first mixture to a temperature suitable for serving said first mixture for consumption;
   (c) mixing a second portion of said bulk reserve of said dry foodstuff mix with an edible liquid to form a second mixture; and
   (d) cooling a member selected from the group consisting of said second mixture and one or more components thereof, to reduce the temperature of said mixture to a temperature suitable for serving said first mixture for consumption.

3. A method of formulating a sweetened and acidulated foodstuff comprising:
   (a) substituting at least a portion of the sweetener in a given sweetened foodstuff formulation with a particulate solid consisting of crystalline fructose, said foodstuff having a pH of below about 5 when consumed; and
   (b) employing a plurality of acidulants to adjust the sweetness of said formulation, said plurality comprising citric acid, or a salt thereof, and an edible, non-citric, fructo-sweetness active acid, or a salt thereof.

4. A beverage concentrate comprising:
   (a) a particulate solid consisting of crystalline of fructose, said fructose being present in a first amount; and
   (b) an acidulant comprised of citric acid in a second amount, and an edible, non-citric, fructo-sweetness active acid in a third amount;
      (i) said second and third amounts are, in the aggregate, sufficient to provide a beverage having a pH of less than about 5;
      (ii) said first amount is sufficient, in relation to said second and third amounts, to provide a sweetened beverage.

5. A beverage concentrate of claim 4 wherein said sweetener consists of crystalline fructose in a major amount by weight of said concentrate and said acidulant is comprised of a major amount by weight of said acidulant of citric acid and a minor amount by weight of an acid selected from the group consisting of (1) malic acid, (2) edible derivatives of malic acid, (3) phosphoric acid, (4) edible derivatives of phosphoric acid, and (5) mixtures selected from one or more of (1), (2), (3) and (4).

* * * * *